July 28, 1964     S. T. CARTER     3,142,374
ARTICLE HOLD-DOWN FOR LABELING MACHINES
Filed Dec. 2, 1960     4 Sheets-Sheet 1
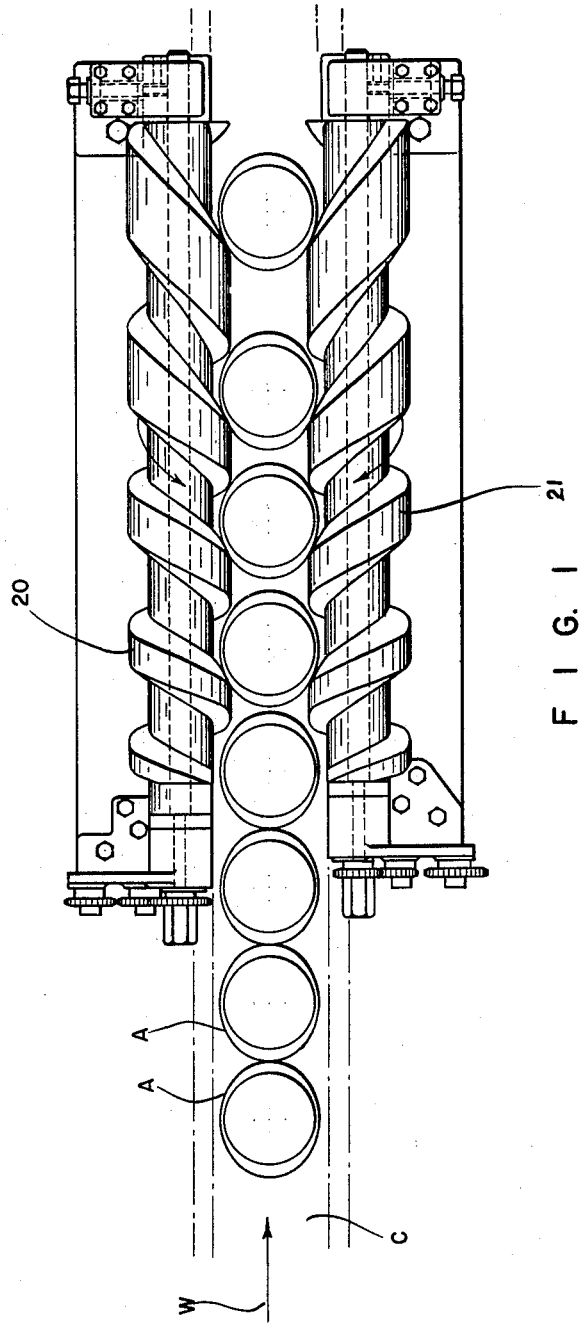
*INVENTOR.*
SIDNEY T. CARTER
BY
ATTORNEYS

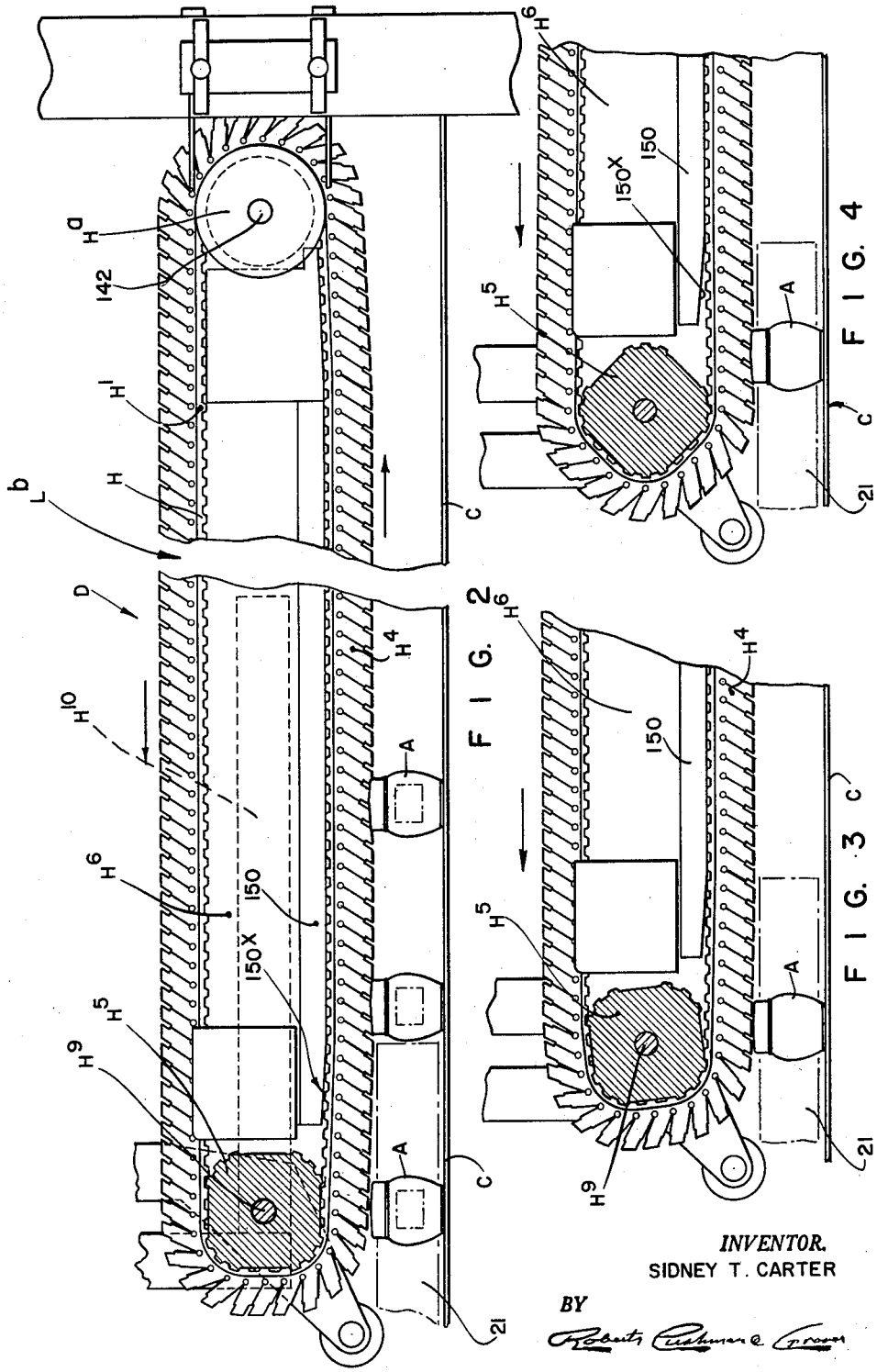

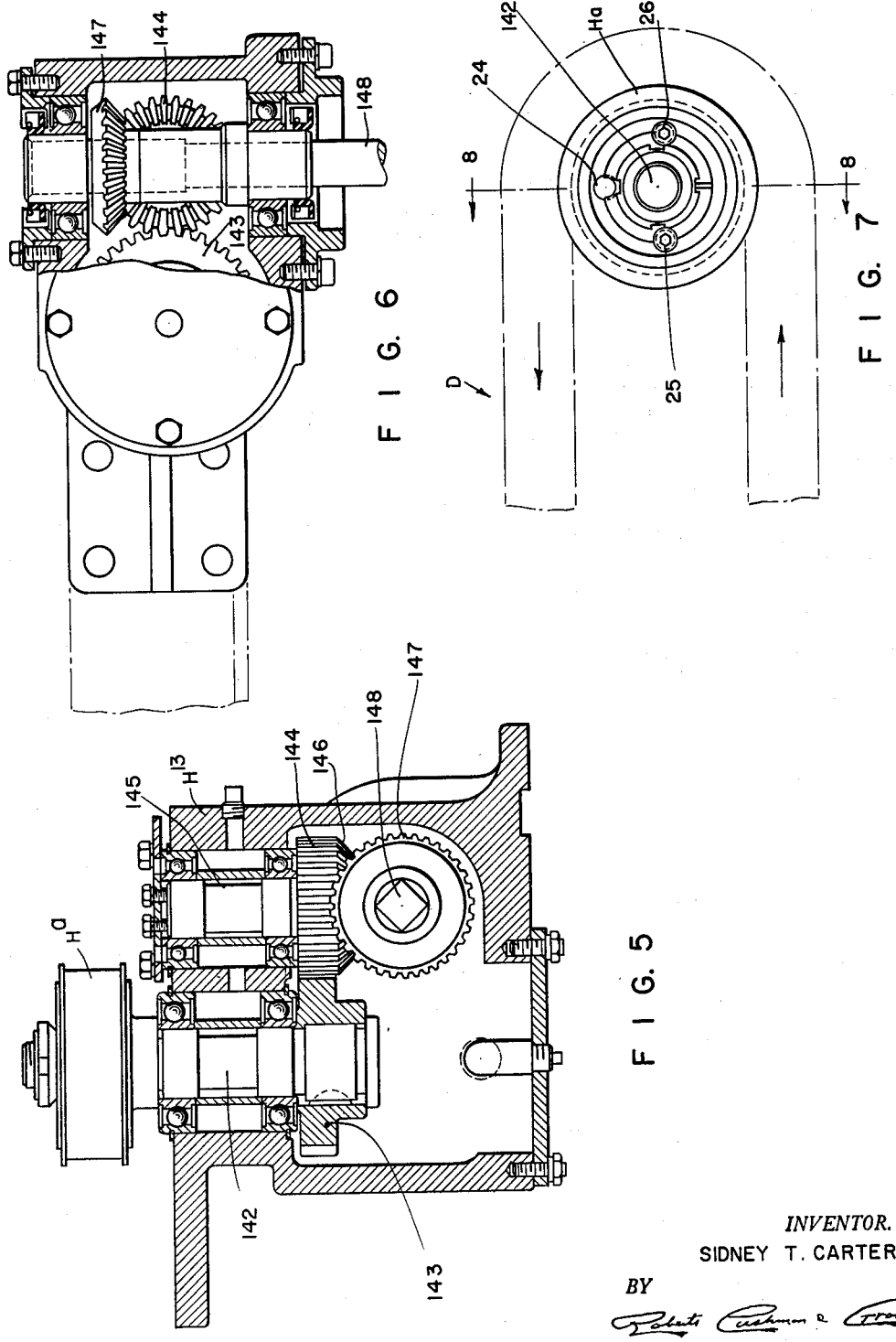

July 28, 1964 S. T. CARTER 3,142,374
ARTICLE HOLD-DOWN FOR LABELING MACHINES
Filed Dec. 2, 1960 4 Sheets-Sheet 4

INVENTOR.
SIDNEY T. CARTER
BY
ATTORNEYS

United States Patent Office

3,142,374
Patented July 28, 1964

3,142,374
ARTICLE HOLD-DOWN FOR LABELING
MACHINES
Sidney T. Carter, Shrewsbury, Mass., assignor to Geo. J. Meyer Manufacturing Co., Cudahy, Wis., a corporation of Wisconsin
Filed Dec. 2, 1960, Ser. No. 73,359
9 Claims. (Cl. 198—165)

This invention pertains to labeling mahcines and relates more especially to an improved hold-down device or head grip of the endless belt type for use in such a machine and, in particular, to novel means for guiding such a hold-down belt as it moves into operative engagement with an article.

For ease in description and illustration, but without limiting intent, the invention is herein described as embodied in a machine, such as that of the patent to Carter, No. 2,940,630, dated June 14, 1960, to which reference may be made for features not specifically related to the present invention and not herein disclosed in detail. While the hold-down belt, specifically described in the above-named patent, is very desirable and satisfactory for its intended purpose, it is contemplated that the belt-guiding means of the present invention is of broader utility and applicable to endless hold-down belts of specifically different types.

The hold-down, disclosed in said patent, and with reference to which the present invention is described, comprises a flexible base portion, for example, of canvas or rubberized fabric such for example, as a so-called "Gilmer Timer Belt" having teeth molded on its inner surface to provide a positive drive similar to that of a sprocket chain, and to the outer surface of this flexible base, that is to say, the side opposite the toothed surface, there is attached a thick layer of soft rubber providing a resiliently yieldable cushion for contact with the tops of the articles to be labeled. At that end of the hold-down, which is adjacent to the point at which the articles are delivered by feeding means into the receiving end of the article path of the labeling machine, the belt passes about a guide sprocket while, at its opposite end, in the direction of travel of the article, the belt passes about a drive sprocket. These sprockets are so arranged as to provide a substantially horizontal lower run of the belt, directly above the path along which the articles are advanced into the field of action of the label-applying devices. To prevent this horizontal lower run of the belt from deflecting upwardly, in the space between the sprockets, a fixed, elongate horizontal guide shoe is arranged to contact this lower run of the belt so as to constrain it to move in an accurately rectilinear path. As received from a source of supply, the articles are advanced by a conveyor into and through the field of action of appropriate spacing and/or orienting means, for example a constantly turning helix or helices, so devised as to space successive articles a predetermined distance apart and to deliver them into the field of action of the hold-down belt in this predetermined spaced relationship. The function of the hold-down device is, by engagement with the top of the article, to clamp the latter down against the conveyor so as to preserve the spacing and orientation of the article, which has been established just prior to its engagement by the hold-down, while the article is advanced through the field of action of the labeling mechanism. It has been found that a belt having a thick layer, for example a 1" layer of sponge rubber, is very effective for holding the article clamped firmly against the conveyor, since such a thick layer of yieldable material is capable of dependably gripping an article even though the article may vary slightly in height or contour from the normal. Customarily, the guide sprocket, about which the hold-down belt passes in moving downwardly into contact with the article as the latter is delivered by the spacing device, is circular and turns at an angular velocity such that its pitch circle has a linear velocity exactly equal to that of the conveyor. However, the article-contacting surface of the thick rubber layer is radially outward beyond the pitch surface of the guide sprocket and thus this outer surface travels at a speed greater than that of the pitch line of the sprocket and greater than that of the conveyor. Thus, as the hold-down belt moves downwardly about the guide sprocket and into engagement with the top of the article moving at conveyor speed, the belt tends to tip the top of the article forwardly to a slight degree. To minimize this effect it has previously been proposed to locate the axis of the guide sprocket, relatively to the conveyor, so that in leaving the guide sprocket the belt forms a substantially straight, downwardly inclined run before it is constrained to move exactly horizontally by its contact with the horizontal guide shoe, and a normal article first contacts the belt where the latter is nearly horizontal. However, if the article, for instance a bottle, be very tall or top-heavy, this expedient is not always sufficient to prevent forward tipping of the article and its retention in this tipped position by the hold-down belt. Low and relatively wide articles, for example cylindrical cosmetic jars, are not usually tipped in this way because they are wider at the base in proportion to their height. However, in the case of certain types of jar, in particular, those which taper downwardly, for example, from about midheight, there is a strong tendency, because of the slight lateral pressure exerted by the spacer helix or helices, to cause the jar to rise from the conveyor and in thus rising the jar may tip in one direction or another. Thus, the hold-down belt, may not always contact the top of the jar or other article squarely so that the jar may be delivered to the labeling machine with its axis other than vertical, with the result that the label is improperly placed.

The principal object of the present invention is to provide means for so guiding the hold-down belt as it approaches article-engaging position that it will have no appreciable tendency to tip the article as it contacts the latter and, in fact, will have a positive action tending to restore the article to the vertical if it be tipped slightly before it contacts the hold-down belt. A further object is to provide means whereby the drive sprocket for the hold-down belt may be very accurately adjusted, so that the belt may be retarded or advanced with reference to the conveyor to insure accurate timing. A further object is to provide an improvement in the hold-down belt such as to permit the article to seat squarely on the conveyor. Other and further objects and advantages of the invention will be pointed out in the following more detailed description and by reference to the accompanying drawings wherein:

FIG. 1 is a more or less diagrammatic plan view illustrating means for spacing and orienting articles such, for example, as jars of elliptical transverse section as they are advanced by conveyor means toward the field of action of label-applying apparatus;

FIG. 2 is a diagrammatic elevation illustrating an endless hold-down belt in operative relation to a conveyor which is advancing short jars in uniformly spaced relation, and means for guiding the belt in accordance with the present invention, the relation of the hold-down belt to the spacing means of FIG. 1, being indicated by broken lines which indicate one of the spacer helices of FIG. 1;

FIG. 3 is a fragmentary view similar to FIG. 2, showing only the receiving end portion of the hold-down belt and illustrating the initial action of the non-circular guide sprocket in moving a segment of the hold-down belt down toward horizontal position preparatory to contacting it with the top of a jar;

FIG. 4 is a view similar to FIG. 3, but showing the guide sprocket as having moved the hold-down belt into actual contact with the top of the jar, the latter having advanced beyond the position of FIG. 3;

FIG. 5 is a horizontal section showing a gear box containing drive mechanism whereby the hold-down belt may be driven;

FIG. 6 is a rear elevation, partly in vertical section, of the gear box of FIG. 5;

FIG. 7 is an end elevation of the shaft to which the drive sprocket for the hold-down belt is secured, showing the belt in broken lines and illustrating means whereby the drive sprocket is adjustably secured to the shaft;

Figure 8:
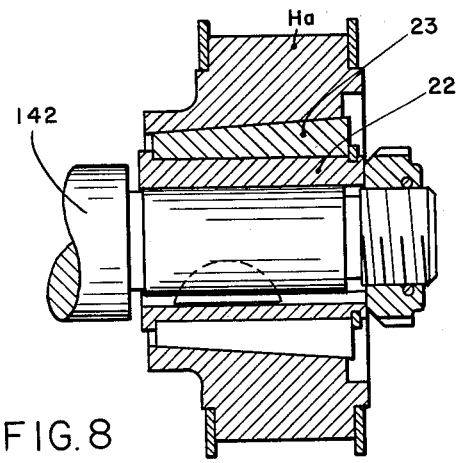
FIG. 8 is a diametrical section to larger scale than FIG. 7, on the line 8—8 of FIG. 7.
Figure 11:
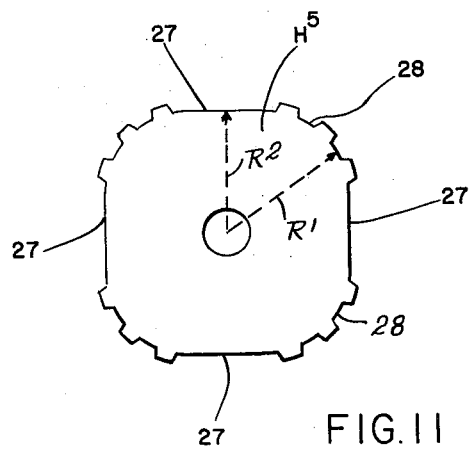
FIG. 11 is an elevation showing the face of the guide sprocket which is shown in section in FIGS. 2, 3 and 4.

It is here assumed, by way of example, that the apparatus herein specifically disclosed, is associated with a labeling machine having a power-driven main shaft and that through the intermediary of appropriate motion-transmitting connections, said main shaft drives the conveyor, article-spacing means, and hold-down devices which are herein illustrated.

Referring to the drawings, the character C designates a conveyor of the endless belt type comprising a horizontal run upon which the articles to be processed stand in upright position while being advanced by the conveyor through the field of action of spacing and/or orienting means and into the field of action of a hold-down belt by means of which the spaced articles are held firmly clamped to the conveyor while they are moving through a processing zone, for example, while being labeled. More specifically, the conveyor C may, for instance, be of the type in which an endless link chain carries a series of flat plates which, in the horizontal run of the chain, collectively constitute a smooth, substantially horizontal surface upon which the articles rest as they are advanced by the conveyor, but which permits relative movement of the articles such as is necessary for spacing them or for orienting them. In the drawings the articles A, which are to be processed, are illustrated by way of example as short, squat jars, elliptical in transverse section and having removable covers with substantially flat tops.

In FIG. 1 these jars A are illustrated as being advanced by the conveyor C from a source of supply (not shown) in a solid column, moving in the direction of the arrow W and between the oppositely rotating helices 20 and 21, which are so designed that as the jars advance between them, the jars are gradually separated, so that, when they emerge from between the helices, adjacent jars are spaced uniform distances apart. The helices 20 and 21 may be turned in opposite directions and at a proper angular velocity by any suitable motion-transmitting connections from a main drive shaft (not shown), for instance, by motion-transmitting connections such as those more fully disclosed in the patent to Carter No. 2,890,787, dated June 16, 1959, wherein, in FIG. 13 of the patent drawings, an arrangement for spacing and orienting articles of elliptical transverse section is illustrated. It is contemplated, that the spacing and orienting means of said patent may, if desired, be substituted for the arrangement herein shown in FIG. 1.

In FIGS. 2, 3 and 4, which are to somewhat smaller scale than FIG. 1, the conveyor C is shown as advancing the jars A, which have been spaced apart a uniform distance by the spacer means, into the field of action of a hold-down device D, which, after engaging and clamping the articles firmly down against the conveyor C, remains in contact with the articles while the latter are passing through the field of action of processing means, for instance a labeling machine, whose location, relatively to the opposite ends of the hold-down device, may be at a position such for example as is indicated by the character L$b$ (FIG. 2), it being noted that the hold-down device D remains in contact with the articles until after they have passed through the field of action of the labeling apparatus.

Figure 9:
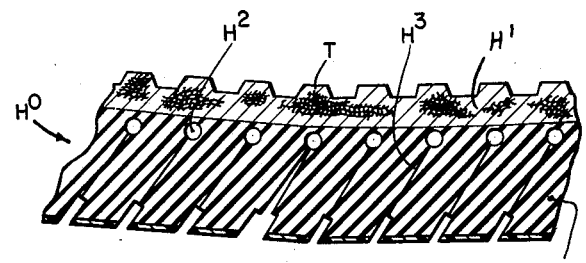
FIG. 9 is a fragmentary longitudinal, vertical section through a portion of the hold-down belt, illustrating the specific construction of a preferred form of hold-down belt.
Figure 10:
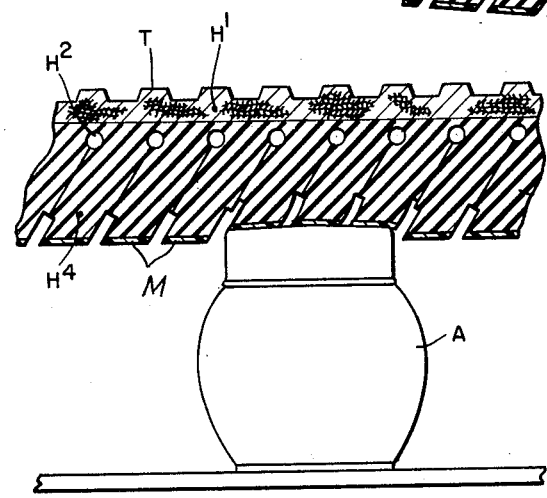
FIG. 10 is a fragmentary elevation showing a jar standing on a conveyor and with the hold-down belt in clamping contact with the top of the jar.

The hold-down device D is here illustrated as of the general type of that described more in detail in the patent to Carter, No. 2,940,630, dated June 14, 1960, the constituent elements of the hold-down device, as far as herein illustrated, being designated by the same reference characters as in said patent. Thus, this hold-down device D comprises an endless belt H, having a substantially rectilinear horizontal run which overlies and is parallel to the article path as defined by the conveyor C—the belt H being driven at exactly the same linear speed as the conveyor C through suitable connections, which may be for example like those which are fully illustrated and described in said Patent No. 2,940,630. The belt H (FIG. 9) comprises a flexible base portion $H^1$, for example of canvas or rubberized fabric. This base portion may be a so-called "Gilmer Timer Belt" and has teeth T molded on its inner surface to provide a positive drive similar to that of a sprocket chain. To the outer surface of this flexible base $H^1$, that is to say, the side opposite that having the teeth T, there is attached a layer $H^0$ of soft rubber or other elastomeric material, for example 1″ in thickness, and which provides a resiliently yieldable cushion for contact with the tops of the containers A. In order that this thick belt may have the requisite flexibility to enable it to move freely about the supporting and guiding devices, the rubber layer is provided at regular intervals, for example at a distance of ¾″ apart with a series of holes $H^2$ (FIGS. 9 and 10), extending transversely through the thickness of the rubber layer. A slit $H^3$ extends inwardly from the outer surface of the rubber layer to each of these holes $H^2$, these slits dividing the rubber layer into substantially rectangular blocks $H^4$. Preferably these slits $H^3$ are so inclined relatively to the face of the belt that in the horizontal lower run of the belt, as shown in FIG. 2 for example, they incline inwardly, upwardly and forwardly for example at an angle of the order of 60° to the vertical— such an arrangement facilitating the engagement of the belt with the articles as they are advanced beneath the receiving end of the belt.

At its left-hand end (FIG. 2), that is to say, the end which is adjacent to the point at which the articles first come into contact with the belt, the belt H passes about a guide sprocket $H^5$ and at its right-hand end, which is located beyond the labeling station L$b$ in the direction of travel of the articles, the belt H passes about a drive sprocket H$a$ which is mounted upon a shaft 142.

An elongate normally stationary rigid frame $H^6$ (FIGS. 2, 3 and 4) is supported at its opposite ends by means, not herein specifically illustrated, but shown and described in the aforesaid Patent No. 2,940,630, so that it may be adjusted vertically to accommodate articles of different heights. Desirably the shaft $H^9$, on which the guide sprocket $H^5$ is mounted, is so supported by the frame $H^6$ that it may be moved toward or from the shaft 142 for the purpose of tightening the belt. Normally, the shaft $H^9$ may be urged away from the shaft 142 to tension the belt by means of a spring, such as the spring $H^{11}$ (FIG. 30) of Carter Patent No. 2,940,630, but with provision whereby the shaft $H^9$ may be moved manually toward the shaft 142 to facilitate removal and replacement of the belt.

As shown in FIGS. 5 and 6, the shaft 142, on which the drive sprocket H$a$ is mounted, turns in bearings in a gear box H$^{13}$ which is fixed to the frame H$^6$, above described, so as to partake of any vertical adjustment of said frame, and within this gear box the shaft 142 carries a spur gear 143 which meshes with a spur gear 144 on a shaft 145, also journaled in the gear box, and which carries a beveled gear 146 which meshes with a beveled gear 147 fixed to a vertical shaft 148 which is driven by means of connections (not herein disclosed), but such for example as are fully shown and described in the aforesaid Patent No. 2,940,630, so that the shaft 148 turns in exact timed relation with the motion of the conveyor and the rotations of the helices 20 and 21.

In accordance with the present invention, the drive sprocket H$a$ is connected to the shaft 142 by means, which may be of conventional type, permitting the sprocket to be angularly adjusted with great nicety relatively to the shaft. As here specifically illustrated a sleeve 22 is keyed to the shaft (FIG. 8), and on this sleeve 22 there is mounted a taper bushing 23, the sprocket H$a$ having a taper bore within which the tapering bushing 23 fits. Three screw-threaded holes (FIG. 7) are arranged to extend into the thicker end of the taper bushing 23, at the junction of the latter with the sprocket H$a$—two of these holes being substantially 180° apart and the other midway between them. Normally, screws 25 and 26, in the holes which are 180° apart, prevent the sprocket H$a$ from turning on the tapered bushing 23. If it be desired to adjust the sprocket H$a$ relatively to the shaft 142, one of the screws, for example the screw 25, is retracted and the other screw 26 is removed and is inserted in the hole 24 and tightened, thereby releasing the taper lock. The screw 26 is now removed from the hole 24 and replaced in the original hole, but loosely, and the sprocket H$a$ is now free to be turned relatively to the shaft 142 to the desired position of adjustment—the screws 25 and 26 now being again tightened.

In accordance with the present invention, and in the attainment of the aforementioned objects, the guide sprocket H$^5$ is of a special construction as illustrated in FIGS. 2, 3, 4 and 11. This sprocket is non-circular in contour and is provided with teeth for engagement with the teeth T of the belt at spaced arcuate portions only. In a general way, this sprocket may be described as "polygonal in contour." Thus the sprocket specifically illustrated in FIGS. 2, 3, 4 and 11, has the substantially straight peripheral faces 27 relatively arranged like the sides of a square, but which do not meet to form corners—the intervals between adjacent sides 27 being occupied by arcuate surfaces defining the pitch radius of toothed portions 28. It will be noted (FIG. 11), that the radius R$^1$ which defines the pitch of the toothed portion 28 is longer than the line R$^2$ extending from the axis of the sprocket, perpendicularly to the side 27. Thus the toothed portion 28 projects outwardly as an arcuate lobe beyond the surfaces 27, and since the toothed portion 28 engages the belt, the flat surfaces 27 do not contact the belt, at least they have no functional contact with the teeth T of the belt.

The frame H$^6$ supports a normally fixed, rigid horizontally elongate guide shoe 150 (FIGS. 2, 3 and 4), whose lower surface is horizontal and which is contacted by the toothed surface of the lower run of the belt, so that, throughout the major portion of the lower run of the belt, the latter is maintained accurately horizontal and rectilinear. Thus the elongate portion of the belt, between the sprockets H$a$ and H$^5$, cannot move upwardly and away from the articles A beneath it. As shown in FIGS. 2, 3 and 4, that end of the guide shoe 150, which is the nearer to the guide sprocket H$^5$ is beveled or sloped upwardly toward the sprocket H$^5$, and the axis of the shaft H$^9$, on which the guide sprocket H$^5$ is mounted, is located at such a distance above the conveyor C and from the horizontal portion of the guide shoe 150, that with the guide sprocket positioned as in FIG. 2, the belt, in leaving guide sprocket H$^5$, forms a run which inclines slightly downwardly and to the right before it is constrained to follow an accurately horizontal path by the horizontal undersurface of the guide shoe 150. The guide sprocket H$^5$ is driven by engagement of its teeth with the teeth T of the belt, and the belt is so timed, relatively to the motion of the conveyor, that as an article A approaches the delivery end of the spacing means, here shown as comprising the helices 20 and 21, the sprocket H$^5$ takes the position illustrated in FIG. 2 wherein one of the flat sides of the sprocket is nearly horizontal.

It will be noted that the first article A, at the left-hand side of FIG. 2, has its axis in the vertical plane of the axis of rotation of the guide sprocket H$^5$, but that, at this point, although the lower surface of the hold-down belt has already become nearly horizontal, the top of the article has not as yet contacted the hold-down belt, but the continued rotation of the guide sprocket H$^5$ as indicated in FIG. 3, and as the article is further advanced by the conveyor, brings a toothed lobe of the sprocket to bear upon that part of the belt which extends between the guide sprocket and the horizontal part of the guide shoe 150, and since the radius R$^1$ (FIG. 11) of this toothed portion of the sprocket exceeds the distance R$^2$ between the axis of the shaft and the flat surface 27 of the sprocket, the result is quickly to push down that segment of the belt which the toothed lobe engages until it is truly horizontal, and, while so horizontal, first contacts the article. This rapid downward motion continues as the article advances until the sprocket has reached the position shown in FIG. 4, wherein this segment of the belt is disposed in its lowest position, with its article-contacting surface in line with the lower surface of the guide shoe 150 and exerting firm resilient pressure upon the top of the article. In this manner the hold-down belt is forced down squarely on top of the jar without exerting any substantial component of force such as would tend to tip the article in one direction or another. In fact, if the article has been tipped slightly, by reason of the action of the helices, the flat under surfaces of the blocks H$^4$, which constitute the belt, in approaching the article in this manner, are effective to restore the article to the vertical position. As shown in FIG. 4, the article is firmly clamped by the hold-down belt against the conveyor and it continues to be held thus until it emerges from beneath the belt after the label has been applied.

With the arrangement specifically described just above, in which the guide H$^5$ has four equally spaced toothed segments, only the diametrically opposite segments are necessary, so far as the function of the sprocket in pressing the belt down into contact with successive articles is concerned. However, since it is necessary that this guide sprocket H$^5$ also function to keep the belt taut, it is desirable to provide the four equally spaced toothed segments, as illustrated, so that when the guide sprocket occupies the position shown in FIG. 4 for example, the left-hand horizontal toothed segment will be operative to keep the belt under tension.

Figure 12:
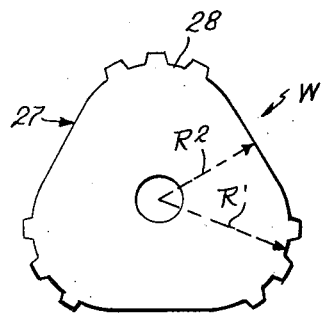
FIG. 12 is a view similar to FIG. 11 but showing a guide sprocket of a different shape.

With a different spacing of the articles on the conveyor, a guide sprocket H$^5$ of a different configuration would be employed. For instance, assuming that in the arrangement heretofore described, the spacing of the articles is 5¼ inches then, if the articles were to be spaced 7 inches instead of 5¼ inches and with the pitch of the sprocket wheel the same, a sprocket wheel W having three equally spaced toothed segments, with intervening flat faces relatively arranged like the sides of an equilateral triangle would be employed, as suggested in FIG. 12.

The adjustability of the drive sprocket H$a$ is extremely important in order that the timing of the guide sprocket H$^5$ may be accurately adjusted with reference to the location of the articles as they are advanced by the conveyor into the space beneath the receiving end of the belt. By adjustment of the guide sprocket on its shaft, the entire belt may be advanced or retarded relatively to the conveyor and, by this means the guide sprocket $H^5$ is rotated in one direction or the other until the desired timing is attained.

In accordance with the present invention, the outer flat faces of the blocks $H^4$ of the belt are coated with a smooth slippery material M in order that the belt may readily slip relatively to the top of the article, so that the article may set firmly and flat on the conveyor chain even though the top of the article may not be accurately flat. Thus, for example, the outer surface of each block $H^4$ of the belt may be coated with a suitable synthetic material, for example one of the so-called Teflon resin varnishes made by the Du Pont Company, or it may have sheet plastic of selected type bonded thereto.

While one desirable embodiment of the invention has herein been disclosed by way of example, it is to be understood that the invention is broadly inclusive of any and all modifications falling within the terms of the appended claims.

I claim:

1. In combination, in a labeling machine which includes a conveyor operative to advance articles along a predetermined path, means operative to arrange articles in accurately spaced relation upon the conveyor, means for driving the conveyor at a predetermined accurate and uniform linear velocity, an endless hold-down belt comprising a resiliently yieldable article-contacting ply, the belt including upper and lower runs and portions connecting the upper and lower runs, the major part of the lower run being parallel to the article path and spaced from the latter a distance such, relatively to the height of the article, that when an article is operatively positioned between the conveyor and said lower run of the belt, the resilient ply of the belt is compressed, and wherein that portion of the belt which is moving downwardly from the upper to the lower run is defined by a rotary belt-positioning device, characterized in that said belt-positioning device is so constructed and arranged that, as it rotates, it first provides a substantially horizontal portion of the belt above each successive article and then moves each such substantially horizontal portion of the belt directly down into contact with the top of the article which is directly below it.

2. The combination according to claim 1, wherein the resilient ply of the belt is of a soft elastomer of the order of one inch in thickness and divided by slits which, in the lower run of the belt, incline upwardly and forwardly and define relatively movable blocks, and a layer of Teflon bonded to the outer surface of each block to form the article-contacting face of the block.

3. In combination, in a labeling machine which includes an endless conveyor having a horizontal article-supporting run, means for delivering articles in definitely spaced relation to the conveyor, an endless hold-down belt comprising a toothed inner ply and a resilient article-engaging outer ply, a drive sprocket engaging the toothed inner ply, means for driving the sprocket at an angular velocity such that the toothed ply of the belt moves at the same linear velocity and in the same direction as the conveyor, a guide sprocket engaging the toothed ply of the belt, said drive and guide sprockets defining upper and lower parallel runs of the belt, the major portion of the lower run being parallel to the conveyor and moving in the same direction, and being at such a distance above the conveyor than when an article is interposed between the conveyor and the hold-down belt the resilient ply of the hold-down belt will be compressed, the guide sprocket defining an arcuate run of the belt, leading from the upper to the lower run of the latter, characterized in that said guide sprocket is of such peripheral contour as at regular intervals, in its rotation, to force that part of the belt, which has just become a portion of said lower run, to move down substantially vertically into contact with an article carried by a conveyor.

4. The combination according to claim 3, wherein the guide sprocket is non-circular, having uniformly spaced arcuate belt-engaging portions, with intervening portions which do not contact the belt, the arcuate portions having teeth for engagement with the teeth of the belt, and means for turning the drive sprocket at an angular velocity such that one of said toothed portions of the guide sprocket will force a portion of the belt vertically down as each successive article moves into position to be contacted by said downwardly moving portion of the belt.

5. The combination according to claim 3, wherein the guide sprocket is driven by engagement of its teeth with the teeth of the belt, and means for so adjusting the belt-driving sprocket on its shaft that one of the belt depressing portions of the guide sprocket will engage and move a segment of the lower run of the belt downwardly in accurately timed relation to the movement of an article by the conveyor so that an article will be in position to be contacted by said downwardly moving segment of the belt.

6. In combination, in a labeling machine which includes a conveyor for moving containers in upright position along a rectilinear path, means for disposing articles in uniformly spaced relation on said conveyor, hold-down means for preventing motion of the spaced articles relatively to the conveyor as they are advanced by the latter, said hold-down means comprising an endless belt having a lower article-engaging run, the major portion of which is parallel to and directly above the conveyor, means whereby said article-engaging run is moved at the same linear velocity and in the same direction as the conveyor, a stationary, elongate, rigid, horizontal guide shoe above said article-engaging run of the belt and which is operative to keep the major portion of said run in contact with the tops of articles as they advance, characterized in having means operative to depress a part of the moving belt, which has just become a portion of said lower run, into contact with the top of an article carried by said conveyor, the means for so depressing a part of the belt comprising a rotary element which turns in accurately timed relation to the spacing of the articles on the conveyor and which comprises peripherally spaced portions of different effective radii which successively engage the belt, that portion of the rotary member, which is of maximum radius, being operative, by engagement with that part of the belt which has just become a portion of the lower run, to compel that part of the belt to move directly down into contact with the top of an article, the angular velocity of said rotary element being such that it turns through an aliquot portion of a revolution as each successive article approaches the end of the guide shoe.

7. In combination, in a labeling machine of the kind which includes a conveyor having a horizontal article-supporting run, means for delivering articles in definitely spaced relation to the conveyor, an endless hold-down belt comprising a toothed inner ply and a resilient article-engaging outer ply, a drive sprocket engaging the toothed inner ply, means for turning the drive sprocket at an angular velocity such that the toothed ply of the belt moves at the same linear velocity and in the same direction as the conveyor, a guide sprocket engaging the toothed ply of the belt, said drive and guide sprocket defining upper and lower parallel runs of the belt, the major portion of the lower run being accurately parallel to the conveyor and moving in the same direction and being at such a distance above the conveyor that, when an article is interposed between the conveyor and the hold-down belt, the resilient ply of the hold-down belt will be compressed where it contacts the article, the guide sprocket being driven by engagement of its teeth with those of the belt, characterized in that the guide sprocket is non-circular, its teeth being confined to spaced arcuate, peripheral lobes separated by intervening portions which do not functionally contact the belt, each of the toothed lobes, by contact with the inner surface of the belt, acting, at times, to force a part of the belt, which has already become a portion of said lower run, directly down, a rotary shaft on which the drive sprocket is mounted, means whereby the drive sprocket may be so rotatably adjusted on its shaft that one or another of the toothed portions of the guide sprocket will urge that part of the belt, which has already become a portion of the lower run, squarely down into contact with the top of each respective article as the latter is advanced by the conveyor into the space beneath the belt.

8. In combination, in a labeling machine which includes a conveyor for moving articles on a carrying surface along a predetermined path, means operative to arrange articles in accurately spaced relation upon said carrying surface, means for driving the conveyor at a predetermined accurate and uniform linear velocity, a hold-down device operative, by contact with the top of an article while being moved by the conveyor, to clamp the article to the conveyor, and wherein the hold-down device includes an endless belt comprising upper and lower runs, the lower run being an article-engaging run parallel to and directly above said carrying surface a distance less than the height of the articles and which is operative, by contact with the tops of articles, to clamp the latter to the conveyor, said lower run of the belt moving in the same direction and at the same linear velocity as the conveyor, characterized in having means comprising a rotary element of polygonal peripheral contour whose periphery engages the inner surface of the belt, and which is operative to cause that part of the hold-down belt, which is about to contact the top of an article, to become horizontal before it contacts the top of the article thereby to avoid tipping the article.

9. In a labeling machine of the kind which includes a conveyor of generally conventional type such as is customarily employed in a bottle labeling machine and which has a horizontal bottle-supporting run and which is operative to move a bottle, standing upon said run, with its axis vertical, along a rectilinear path at uniform speed through a label-applying zone, hold-down means operative, by contact with the top of the moving bottle, to prevent the bottle from tipping during the application of the label, said hold-down means comprising an endless belt having teeth on one face for engagement with a rotary toothed drive element and whose opposite face is of yieldably resilient material, said belt having upper and lower runs parallel to the bottle-supporting run of the conveyor, and said drive element being so actuated that the bottle-contacting run of the belt moves at the same linear velocity and in the same direction as the bottle-supporting run of the conveyor, bottle spacing means accurately timed, with relation to the motion of the conveyor and belt, to dispose bottles to be labeled in uniformly spaced relation on the bottle-supporting run of the conveyor, and a normally fixed, rigid, horizontally elongate guide shoe parallel to the bottle-supporting run of the conveyor and above the latter and having a lower surface, the major portion of whose length is horizontal and which is contacted by the toothed surface of the lower run of the hold-down belt so that, through the major portion of said lower run of the belt, the bottle-contacting surface of the belt is maintained horizontal and rectilinear and at a uniform distance above the bottle-supporting run of the conveyor such that the lower run of the hold-down belt exerts clamping pressure against the top of a bottle carried by the conveyor and located beneath said horizontal portion of the belt, characterized in that that end portion of the guide shoe, which is directed toward an advancing article carried by the conveyor and approaching the hold-down belt, slopes upwardly and normally constitutes a guide for that part of the moving belt which is about to become a portion of its lower run, and means so accurately timed, with reference to the article-spacing means and conveyor as, at regularly recurrent intervals, to push the belt away from said sloping surface of the guide shoe and squarely down onto the top of the advancing bottle thereby to prevent the oncoming belt from tipping the bottle forwardly as the botle is contacted by the belt and while being advanced by the conveyor into the space between the conveyor and the horizontal portion of the lower run of the belt.

References Cited in the file of this patent

UNITED STATES PATENTS

| | | |
|---|---|---|
| 899,440 | Shuman | Sept. 22, 1908 |
| 1,606,750 | Clark | Nov. 16, 1926 |
| 2,693,403 | Brumbaugh | Nov. 2, 1954 |
| 2,918,020 | Henderson | Dec. 22, 1959 |
| 2,940,630 | Carter | June 14, 1960 |

FOREIGN PATENTS

| | | |
|---|---|---|
| 433,958 | Germany | Sept. 11, 1926 |
| 505,122 | Belgium | Aug. 31, 1951 |